(12) United States Patent
Morris et al.

(10) Patent No.: US 10,534,148 B2
(45) Date of Patent: Jan. 14, 2020

(54) OPTICAL INTERCONNECT DEVICE

(71) Applicant: HEWLETT PACKARD ENTERPRISE DEVELOPMENT LP, Houston, TX (US)

(72) Inventors: Terrel L Morris, Garland, TX (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/521,371

(22) PCT Filed: Oct. 24, 2014

(86) PCT No.: PCT/US2014/062238
§ 371 (c)(1),
(2) Date: Apr. 24, 2017

(87) PCT Pub. No.: WO2016/064426
PCT Pub. Date: Apr. 28, 2016

(65) Prior Publication Data
US 2017/0329094 A1 Nov. 16, 2017

(51) Int. Cl.
*G02B 6/12* (2006.01)
*G02B 6/43* (2006.01)
(Continued)

(52) U.S. Cl.
CPC ............. *G02B 6/43* (2013.01); *G02B 6/2817* (2013.01); *G02B 6/3616* (2013.01); *G02B 6/4478* (2013.01)

(58) Field of Classification Search
USPC ...................................................... 385/14, 88
See application file for complete search history.

(56) References Cited

U.S. PATENT DOCUMENTS

| 450,412 A | 3/1985 | Carlsen et al. |
| 4,988,157 A | 1/1991 | Jackel et al. |
| (Continued) | | |

FOREIGN PATENT DOCUMENTS

| EP | 2112790 A1 | 10/2009 |
| JP | 2008-514997 A | 5/2008 |
| (Continued) | | |

OTHER PUBLICATIONS

Amphenol Corporation, Fiber Management System, retrieved from Internet Jul. 30, 2014, 22 pages. <http://www.amphenol-fiberoptics.com/assets/page/2f41ec14dbbbb8fb01576a89c8132509/Fiber%20Management%20Catalog.pdf>|.

(Continued)

*Primary Examiner* — Eric Wong
(74) *Attorney, Agent, or Firm* — Sheppard Mullin Richter & Hampton LLP

(57) ABSTRACT

One example includes an optical interconnect device. The optical interconnect device includes a plurality of optical fiber ports coupled to a body portion. The optical interconnect device also includes a plurality of optical fibers that are secured within the body portion. A first portion of the plurality of optical fibers can extend from a first of the plurality of optical fiber ports to a second of the plurality of optical fiber ports, and a second portion of the plurality of optical fibers can extend from the first of the plurality of optical fiber ports to a third of the plurality of optical fiber ports.

20 Claims, 3 Drawing Sheets

(51) Int. Cl.
*G02B 6/28* (2006.01)
*G02B 6/36* (2006.01)
*G02B 6/44* (2006.01)

(56) References Cited

U.S. PATENT DOCUMENTS

| | | | |
|---|---|---|---|
| 5,037,179 A * | 8/1991 | Bortolin | G02B 6/3803 385/54 |
| 5,268,981 A | 12/1993 | Shahid | |
| 5,717,803 A | 2/1998 | Yoneda et al. | |
| 5,786,560 A | 7/1998 | Tatah et al. | |
| 5,960,131 A | 9/1999 | Fouquet et al. | |
| 6,055,344 A | 4/2000 | Fouquet et al. | |
| 6,134,369 A | 10/2000 | Kurosawa | |
| 6,154,586 A | 11/2000 | MacDonald et al. | |
| 6,164,837 A | 12/2000 | Haake et al. | |
| 6,345,132 B1 | 2/2002 | Schmidt et al. | |
| 6,356,679 B1 | 3/2002 | Kapany | |
| 6,366,715 B1 | 4/2002 | Wang et al. | |
| 6,374,020 B1 | 4/2002 | Paniccia | |
| 6,396,972 B1 | 5/2002 | O'Rourke et al. | |
| 6,463,192 B1 | 10/2002 | Kapan | |
| 6,487,333 B2 | 11/2002 | Fouquet et al. | |
| 6,617,568 B1 | 9/2003 | Matsuda | |
| 6,690,845 B1 | 2/2004 | Yoshimura et al. | |
| 6,711,315 B1 | 3/2004 | Joseph et al. | |
| 6,768,830 B1 | 7/2004 | Lacey et al. | |
| 6,882,769 B1 | 4/2005 | Maitan | |
| 6,895,139 B2 | 5/2005 | Schwiebert et al. | |
| 6,915,032 B1 | 7/2005 | White et al. | |
| 7,541,058 B2 | 6/2009 | Chan et al. | |
| 7,623,743 B2 | 11/2009 | Furuyama | |
| 7,653,272 B2 | 1/2010 | Cham et al. | |
| 7,713,767 B2 | 5/2010 | Chan et al. | |
| 8,113,724 B2 | 2/2012 | Terada et al. | |
| 8,120,450 B2 | 2/2012 | Kondo et al. | |
| 8,195,016 B2 | 6/2012 | Shacklette | |
| 8,270,792 B1 | 9/2012 | Ng | |
| 8,718,436 B2 | 5/2014 | Barnes et al. | |
| 9,442,251 B2 | 9/2016 | Sakai et al. | |
| 2002/0005574 A1 | 1/2002 | Zhou | |
| 2002/0039468 A1* | 4/2002 | Lin | G02B 6/43 385/17 |
| 2003/0002030 A1 | 1/2003 | Schroeder | |
| 2003/0021551 A1 | 1/2003 | Carpenter et al. | |
| 2005/0031265 A1* | 2/2005 | Simon | G02B 6/3636 385/38 |
| 2005/0276562 A1 | 12/2005 | Battey et al. | |
| 2006/0133718 A1 | 6/2006 | Liu | |
| 2006/0215954 A1 | 9/2006 | Jenkins et al. | |
| 2007/0060970 A1* | 3/2007 | Burdon | A61N 1/3754 607/37 |
| 2007/0230876 A1* | 10/2007 | Beer | G02B 6/4202 385/88 |
| 2007/0258683 A1 | 11/2007 | Rolston et al. | |
| 2009/0002849 A1 | 1/2009 | Kim et al. | |
| 2009/0028499 A1 | 1/2009 | Maki et al. | |
| 2009/0103861 A1 | 4/2009 | Presley et al. | |
| 2009/0304331 A1 | 12/2009 | Herman et al. | |
| 2010/0178007 A1 | 7/2010 | Thomson et al. | |
| 2010/0215317 A1 | 8/2010 | Rolston et al. | |
| 2011/0096778 A1 | 4/2011 | Binder | |
| 2011/0280534 A1* | 11/2011 | Lin | G02B 6/3616 385/134 |
| 2012/0039567 A1 | 2/2012 | Herman et al. | |
| 2012/0072614 A1 | 3/2012 | Marr et al. | |
| 2012/0177381 A1 | 7/2012 | Dobbelaere et al. | |
| 2012/0207438 A1* | 8/2012 | Yu | G02B 6/43 385/101 |
| 2012/0314382 A1* | 12/2012 | Wesselmann | H05K 1/0283 361/749 |
| 2012/0321309 A1 | 12/2012 | Barry et al. | |
| 2013/0058616 A1 | 3/2013 | Cote et al. | |
| 2013/0246990 A1 | 9/2013 | Yen et al. | |
| 2014/0112632 A1 | 4/2014 | Keenum et al. | |
| 2014/0179034 A1 | 6/2014 | Bartwicz et al. | |
| 2014/0193116 A1 | 7/2014 | Bylander et al. | |

FOREIGN PATENT DOCUMENTS

| | | |
|---|---|---|
| TW | 201319890 A | 5/2013 |
| WO | WO-2014088980 A1 | 6/2014 |

OTHER PUBLICATIONS

PCT/ISA/KR, International Search Report, dated Jul. 28, 2015, PCT/US2014/062238, 15 pages.
International Preliminary Report on Patentability received for PCT Patent Application No. PCT/US2015/013306, dated Aug. 10, 2017, 9 pages.
International Preliminary Report on Patentability received for PCT Patent Application No. PCT/US2014/062238, dated May 4, 2017, 11 pages.
International Preliminary Report on Patentability received for PCT Patent Application No. PCT/US2014/061960 , dated May 4, 2017, 11 pages.
International Preliminary Report on Patentability received for PCT Patent Application No. PCT/US2014/061953, dated May 4, 2017, 8 pages.
Beresna, M. et al., "Ultrafast Laser Direct Writing and Nanostructuring in Transparent Materials," Advances in Optics and Photonics 6.3, Aug. 15, 2014, pp. 293-339.
Gattass, R. et al., "Femtosecond Laser Micromachining in Transparent Materials," (Research Paper), 2008, pp. 219-225, available at http://www.nature.com/nphoton/journal/v2/n4/full/nphoton.2008.47.html.
Ghafoor, A. et al., Architecture of an All-optical Circuit-switched Multistage Interconnection Network [online], Oct. 1990, Retrieved from the Internet <http://ieeexplore.ieee.org/xpl/articleDetails.jsp?tp=&amumber=62837&matchBoolean%3Dtrue%26pageNumber%3D2%26searchField%3DSearch_All%26queryText%3D%28%28%28%28%28optic*%29+AND+switch*%29+AND+parallel*%29+AND+input%29+AND+output%29 > [retrieved on Jul. 30, 2014].
Huang, H. et al., "Femtosecond Fiber Laser Direct Writing of Optical Waveguide in Glasses," SPIE Optical Engineering+ Applications, International Society for Optics and Photonics, 2011, 8 pages, available at http://www.polaronyx.com/publications/Femtosecond_fiber_laser_direct_writing_in_glasses.pdf.
Hunziker, W. et al., Low-loss, Self-aligned Flip-chip Technique for Interchip and Fiber Array to Waveguide Oeic Packaging, 1994, IEEE LEOS, pp. 269-270.
International Search Report & Written Opinion received in PCT Application No. PCT/US2015/013306, dated Oct. 26, 2015, 12 pages.
Marshall, G.D. et al., "Laser Written Waveguide Photonic Quantum Circuits," Optics Express 17.15, Jul. 20, 2009, pp. 12546-12554, available at http://web.science.mq.edu.au/~graham/publications/articles/marshall_oe_17-15_12546_2009.pdf.
Meany, T., "Optical Manufacturing: Femtosecond-Laser Direct-Written Waveguides Produce Quantum Circuits in Glass," Jul. 8, 2014, Laser Focus World, vol. 50, No. 7, 10 pages.
OZ Optics Company, Polarization Maintaining Fiber Pigtailed V-groove Assemblies [online], Mar. 19, 2002, Retrieved from the Internet <http://www.ozoptics.com/news/pr_113.html>.
PCT/ISA/KR, International Search Report, dated -Jul. 24, 2015, PCT/US2014/061960, 12 pages.
PCT/ISA/KR, International Search Report, dated Jun. 30, 2015, PCT/US2014/061953; 9 pages.
Shi, Y. et al., Fabrication of High Precision Self-aligned V-grooves Integrated on Silica-on-silicon Chips, Jun. 15, 2014, Photonics Technology Letters, IEEE, vol. 26, Issue 12, pp. 1169-1171.
Vazquez, R.M. et al., "Integration of Femtosecond Laser Written Optical Waveguides in a Lab-on-Chip," Nov. 6, 2008, Lab on a Chip, 2009, vol. 9, pp. 91-96.

* cited by examiner

US 10,534,148 B2

OPTICAL INTERCONNECT DEVICE

BACKGROUND

Optical communications have become more prevalent as the demand for high-speed communication and processing has increased. Optical communications typically implement a laser and/or other optical devices for providing and receiving optical signals that are carried on optical fibers. Routing optical fibers across a plurality of interconnected computer nodes or networking switches can be difficult due to the complexity of the routes, the density of connector faceplates, and the sequencing of fiber attachment to the computing or switching equipment. Certain system topologies, notably meshes and torus configurations, can be particularly challenging, particularly in large-scale optical network topologies. Additionally, an optical shuffle can be required in routing optical fibers, which can allow optical fibers in an assembly to be rearranged as they pass through a given area.

DETAILED DESCRIPTION

Figure 1:
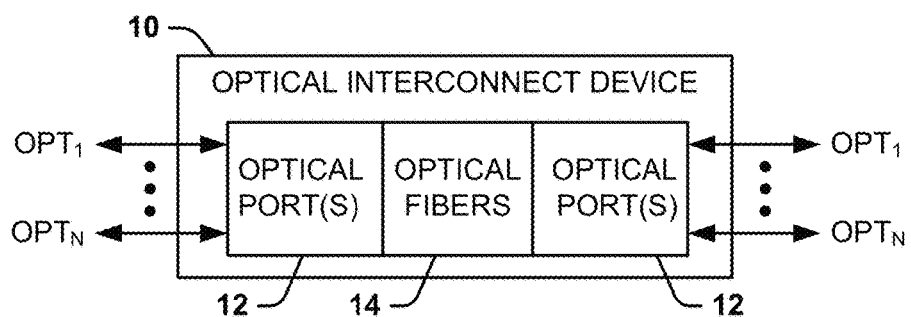
FIG. 1 illustrates an example of an optical interconnect device.

FIG. 1 illustrates an example of an optical interconnect device 10. The optical interconnect device 10 can be implemented in a variety of electro-optical computing and/or communications systems that implement the transfer of optical signals. The optical interconnect device 10 includes a plurality of optical fiber ports 12 and a plurality of optical fibers 14, and is configured to route a plurality N of optical signals, demonstrated as OPT1 through OPTN in the example of FIG. 1, between the plurality of optical fiber ports 12 via the optical fibers 14. For example, the optical interconnect device 10 can include a body portion to which the optical fiber ports 12 are coupled and through which the optical fibers 14 extend, such that the body portion can secure the optical fibers 14 therein.

As an example, the optical fiber ports 12 can include mechanical optical connectors into which external optical fibers or optical fiber cables can be plugged, or can include sealed pass-through connections of the optical fibers 14 in the optical interconnect device 10, such that the optical fibers 14 can extend contiguously and uninterrupted from the optical interconnect device 10. In addition, as described herein, the term "optical fiber" can refer to a single optical fiber (e.g., including a core and a cladding) to provide unidirectional optical communication, can refer to a bidirectional pair of optical fibers (e.g., each including a core and a cladding) to provide both transmit and receive communications in an optical network, or can refer to a multi-core fiber, such that a single cladding could encapsulate a plurality of single-mode cores.

The optical fibers 14 can extend between the optical fiber ports 12 to provide the optical signals $OPT_1$ through $OPT_N$ between the optical fiber ports 12, such that a first portion of the optical fibers 14 can extend from a first of the optical fiber ports 12 to a second of the optical fiber ports 12, and a second portion of the optical fibers 14 can extend from the first of the optical fiber ports 12 to a third of the optical fiber ports 12. As an example, the optical fiber ports 12 can be arranged to split the optical signals $OPT_1$ through $OPT_N$ between separate optical fiber ports 12, such that optical fibers 14 associated with all of the optical signals $OPT_1$ through $OPT_N$ can be provided through a first of the optical fiber ports 12, with the quantity of the optical fibers 14 being split from the first of the optical fiber ports 12 to two or more additional optical fiber ports 12. As another example, one of the optical fibers 14 can extend between each pair of the optical fiber ports 12 to provide optical connectivity between each optical fiber port 12 and each other optical fiber port 12 in an "all-to-all" fiber routing arrangement.

As an example, the optical interconnect device 10 can include a substrate on which the optical fibers 14 are disposed between the optical fiber ports 12. For example, the optical fibers 14 can be provided on the substrate via V-grooves that have been etched onto a surface of the substrate. Then optical fibers 14 can be secured between the optical ports 12 based on a molding material that is disposed on the surface of the substrate over the optical fibers 14, such as in an overmolding procedure during fabrication of the optical interconnect device 10. Additionally, the optical fibers 14 may be loosely routed by pins which protrude through holes in an associated substrate as part of the molding process, such that the pins can be removed when the associated substrate is extracted from the mold. Furthermore, in some optical configurations, it may be unnecessary to constrain the position of the optical fibers 14 within the confines of the associated substrate, as the entry and exit points for the optical fibers 14 can be defined by the optical ports 12.

Figure 2:
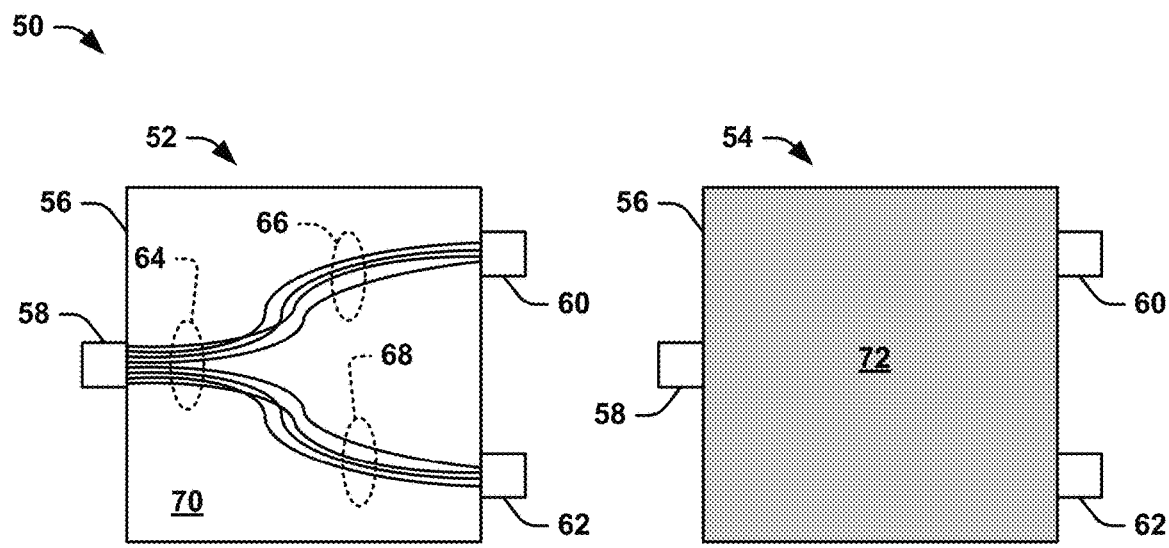
FIG. 2 illustrates another example of an optical interconnect device.

FIG. 2 illustrates another example of an optical interconnect device 50. The optical interconnect device 50 can correspond to the optical interconnect device 10 in the example of FIG. 1. Therefore, reference is to be made to the example of FIG. 1 in the following description of the example of FIG. 2.

The optical interconnect device 50 is demonstrated in a first view 52 and a second view 54. The optical interconnect device 50 includes a body portion 56 and a first optical fiber port 58, a second optical fiber port 60, and a third optical fiber port 62 that are coupled to the body portion 56. As an example, the optical fiber ports 58, 60, and 62 can be configured as strain reliefs or can include strain reliefs. The optical interconnect device 50 also includes a plurality of optical fibers 64, as demonstrated in the first view 52, that extend between the optical fiber ports 58, 60, and 62. In the example of FIG. 2, the optical fibers 64 are demonstrated as a quantity of eight optical fibers 64 that extend from the first optical fiber port 58 and which are split into a first portion 66 (e.g., of four optical fibers) that extend from the first optical fiber port 58 to the second optical fiber port 62 and a second portion 68 (e.g., of four optical fibers) that extend from the first optical fiber port 58 to the third optical fiber port 62. Therefore, the optical interconnect device 50 can be provided to split a larger group of the optical fibers 64, such as externally coupled to the first optical fiber port 58 (e.g., via an optical fiber cable or bundle), into smaller groups (e.g., the portions 66 and 68) of the optical fibers 64, such as externally coupled to the respective second and third optical fiber ports 60 and 62 (e.g., via optical fiber cables or bundles).

The body portion 56 can include a substrate 70, as demonstrated in the first view 52, and a molding material 72, as demonstrated in the second view 54. As an example, the substrate 70 can be formed from a suitable rigid material (e.g., a laminate material) that is prepared by trimming to appropriate dimensions. During fabrication of the optical interconnect device 50, the optical fibers 64 can be disposed on the substrate 70 to extend between the optical fiber ports 58, 60, and 62. As one example, the optical fibers 64 can terminate at each of the optical fiber ports 58, 60, and 62, such that the optical fiber ports 58, 60, and 62 can correspond to mechanical fiber connectors that can optically couple the optical fibers 64 with optical fibers that are externally coupled to the optical fiber ports 58, 60, and 62. As another example, the optical fibers 64 can extend through the optical fiber ports 58, 60, and 62, such that the optical fibers 64 are secured within the body portion 56 between the optical fiber ports 58, 60, and 62. For example, V-grooves can be etched onto a surface of the substrate 70, such that the optical fibers 64 can be received in the V-grooves. As another example, the substrate 70 can have an adhesive on the surface to which the optical fibers 64 can be adhered into place. As yet another example, the optical fibers 64 may be loosely routed by pins which protrude through holes in the substrate 70 as part of the molding process, and which are removed when the substrate is extracted from the mold. Furthermore, as described previously, constraining the position of the optical fibers 64 within the confines of the substrate may not be necessary, as the entry and exit points for the optical fibers 64 can be defined by the optical ports 58, 60, and 62.

The molding material 72 can then be disposed on the surface of the substrate 70 over the optical fibers 64 during a molding process (e.g., an overmolding process). Therefore, the first view 52 can correspond to a deconstructed view of the optical interconnect device 50 relative to the second view 54 based on the absence of the molding material 72 in the first view 52. For example, the molding material 72 can be a silica-filled mold compound to provide control of Thermal Coefficient of Expansion (TCE) and flatness over a wide range of temperatures. Therefore, the molding material 72 can secure the optical fibers 64 within the body portion 56 between the optical fiber ports 58, 60, and 62. In addition, as an example, the optical fiber ports 58, 60, and 62 can be molded to the body portion 56 by the molding material 72, such that the optical fiber ports 58, 60, and 62 can be secured in fixed locations onto the body portion 56 by the molding material 72. The molding material 72 is thus configured to protect and secure the bare optical fibers 64 within the body portion 56.

Figure 3:
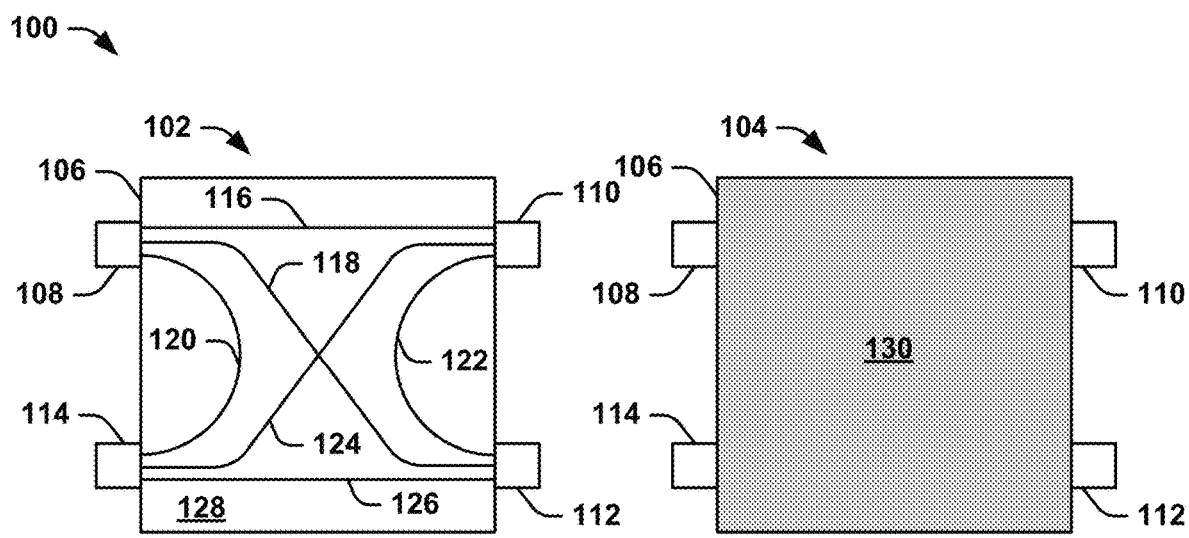
FIG. 3 illustrates yet another example of an optical interconnect device.

FIG. 3 illustrates yet another example of an optical interconnect device 100. The optical interconnect device 100 can correspond to the optical interconnect device 10 in the example of FIG. 1. Therefore, reference is to be made to the example of FIG. 1 in the following description of the example of FIG. 3.

The optical interconnect device 100 is demonstrated in a first view 102 and a second view 104. The optical interconnect device 100 includes a body portion 106 and a first optical fiber port 108, a second optical fiber port 110, a third optical fiber port 112, and a fourth optical fiber port 114 that are coupled to the body portion 106. As an example, the optical fiber ports 108, 110, 112, and 114 can be configured as strain reliefs or can include strain reliefs. The optical interconnect device 100 also includes a plurality of optical fibers, as demonstrated in the first view 102, that extend between the optical fiber ports 108, 110, 112, and 114.

In the example of FIG. 3, the optical fibers include a first optical fiber 116 that extends between the first optical fiber port 108 and the second optical fiber port 110, a second optical fiber 118 that extends between the first optical fiber port 108 and the third optical fiber port 112, and a third optical fiber 120 that extends between the first optical fiber port 108 and the fourth optical fiber port 114. Additionally, the optical fibers include a fourth optical fiber 122 that extends between the second optical fiber port 110 and the third optical fiber port 112, a fifth optical fiber 124 that extends between the second optical fiber port 110 and the fourth optical fiber port 114, and a sixth optical fiber 126 that extends between the third optical fiber port 112 and the fourth optical fiber port 114. Therefore, each of the optical fibers 116, 118, 120, 122, 124, and 126 can extend between a pair of the optical fiber ports 108, 110, 112, and 114 to provide optical connectivity between each of the optical fiber ports 108, 110, 112, and 114. Accordingly, the optical interconnect device 100 can be configured to provide "all-to-all" optical fiber routing between each of the optical fiber ports 108, 110, 112, and 114.

The optical interconnect device 100 can be fabricated substantially similarly to the optical interconnect device 50 in the example of FIG. 2. The body portion 106 can include a substrate 128, as demonstrated in the first view 102, and a molding material 130, as demonstrated in the second view 104. The optical fibers 116, 118, 120, 122, 124, and 126 can be disposed on the substrate 128 to extend between the optical fiber ports 108, 110, 112, and 114, and the molding material 130 can then be disposed on the surface of the substrate 128 over the optical fibers 116, 118, 120, 122, 124, and 126 during a molding process (e.g., an overmolding process). Therefore, the first view 102 can correspond to a deconstructed view of the optical interconnect device 100 relative to the second view 104 based on the absence of the molding material 130 in the first view 102. Thus, the molding material 130 can protect and secure the optical fibers 116, 118, 120, 122, 124, and 126 within the body portion 106 between the optical fiber ports 108, 110, 112, and 114. Additionally, similar to as described previously regarding the example of FIG. 2, the optical fiber ports 108, 110, 112, and 114 can be molded to the body portion 106 by the molding material 130, such that the optical fiber ports 108, 110, 112, and 114 can be secured in fixed locations onto the body portion 106 by the molding material 130.

The optical interconnect devices 50 and 100 in the examples of FIGS. 2 and 3 are examples of a manner for providing multiple optical fibers to be simultaneously routed through an assembly in a fashion that is not reliant upon slow, expensive, and overly-precise optical fiber placement. Fabrication of the optical interconnect devices 50 and 100 can reduce time-on-machine, thus removing the need for many parallel machines to provide sufficient manufacturing capability for high-volume applications. Additionally, the optical interconnect devices 50 and 100 allow a wide variety of assemblies and configurations that can be created quickly and predictably in a semi-automated fashion. Additionally, as described in greater detail herein, the optical interconnect devices 50 and 100 also greatly simplify complex routing cases, such as "all-to-all" mesh construction.

It is to be understood that optical interconnect devices 50 and 100 are not limited to the examples of FIGS. 2 and 3, respectively. As an example, while the optical interconnect device 50 is demonstrated as having three optical fiber ports 58, 60, and 62 and the optical interconnect device 100 is demonstrated as having four optical fiber ports 108, 110, 112, and 114, the optical interconnect devices 50 and 100 could include more or less optical fiber ports, respectively. Additionally, while the optical interconnect device 50 is demonstrated as splitting the optical fibers 64 into the first portion 66 and the second portion 68 with respect to the optical fiber ports 58, 60, and 62, and while the optical interconnect device 100 is demonstrated as providing "all-to-all" routing of the optical fibers 116, 118, 120, 122, 124, and 126, between the optical fiber ports 108, 110, 112, and 114, the optical interconnect devices 50 and 100 could have the optical fibers extend between the optical fiber ports in a variety of ways. For example, the optical interconnect devices 50 and 100 could be configured to provide both splitting and "all-to-all" fiber routing between all or a portion of all of the respective optical fiber ports. Therefore, the optical interconnect devices 50 and 100 can be configured in a variety of ways.

Figure 4:
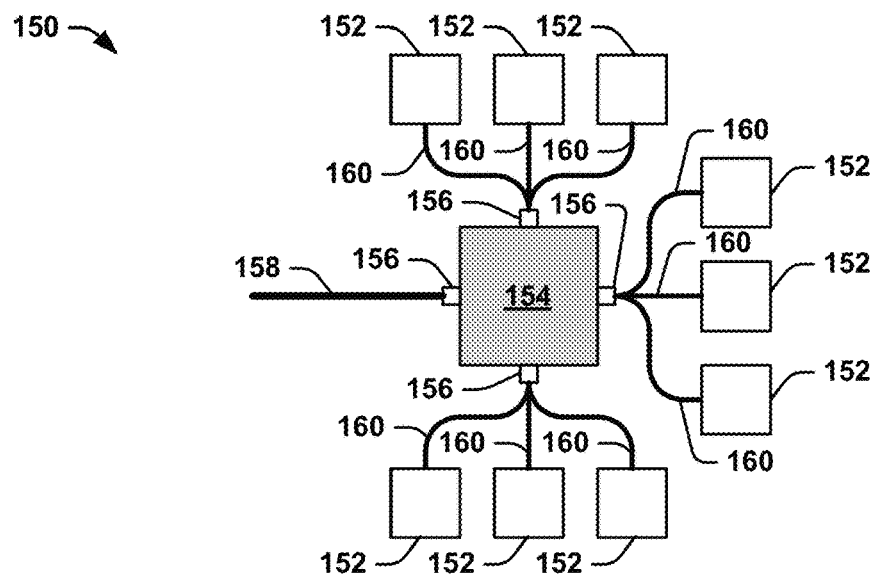
FIG. 4 illustrates an example of an optical interconnect system.

FIG. 4 illustrates an example of an optical interconnect system 150. The optical interconnect system 150 can correspond to a network that implements optical communications between a plurality of optical devices 152. As an example, the optical devices 152 can correspond to electro-optic chips, computers, enterprise servers, and/or a combination thereof.

The optical interconnect system 150 includes an optical interconnect device 154 that is demonstrated in the example of FIG. 4 as including four optical fiber ports 156. A first of the optical fiber ports 156 couples the optical interconnect device 154 with an optical fiber cable 158 that can include a plurality of optical fibers 160 therein. As an example, the optical fiber cable 158 can couple the optical devices 152 to a network (e.g., the Internet), such as via an optical router, switch, or other network device. The optical fibers 160 can thus couple each of the optical devices 152 to the optical interconnect device 154 via the remaining optical fiber ports 156.

As an example, the optical interconnect device 154 can be configured substantially similar to the optical interconnect device 50 in the example of FIG. 2, such that portions of the optical fibers 160 that are associated with the optical fiber cable 158 extend to each of the respective other optical fiber ports 156. Additionally or alternatively, the optical fibers 160 that are secured in the optical interconnect device 156 (e.g., via a molding material) can extend between each of the other optical fiber ports 158, such as similar to the optical interconnect device 100 in the example of FIG. 3, to provide optical interconnectivity between the optical devices 152. Therefore, the optical interconnect system 150 can be configured in a variety of ways. By coupling the optical devices 152 to the optical interconnect device 154, the network can be arranged in a more efficient and organized manner than by providing optical fiber connectivity of the optical devices 152 directly to the network (e.g., the Internet), such as via an optical router, switch, or other network device, and/or by providing optical fiber connectivity to each other. For example, the lengths and amount of optical fibers 160 can be better controlled and more efficiently organized by implementing optical connectivity of the optical devices 152 to the optical interconnect device 154.

Figure 5:
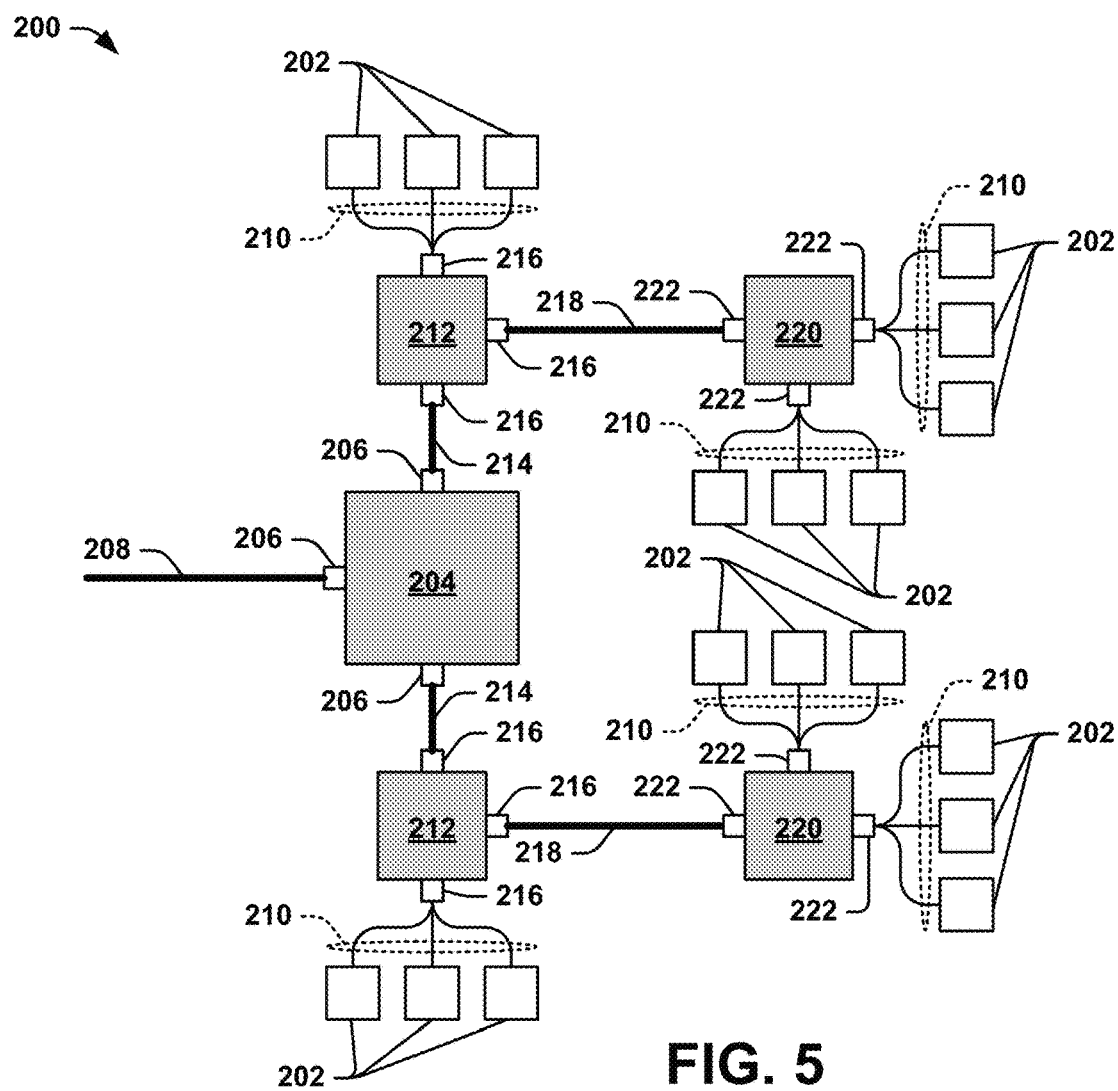
FIG. 5 illustrates another example of an optical interconnect system.

FIG. 5 illustrates another example of an optical interconnect system 200. The optical interconnect system 200 can correspond to a network that implements optical communications between a plurality of optical devices 202. Similar to as described previously in the example of FIG. 4, the optical devices 202 can correspond to electro-optic chips, computers, enterprise servers, and/or a combination thereof. The optical interconnect system 200 is demonstrated in the example of FIG. 5 as having a cascaded-tree arrangement, as described in greater detail herein.

The optical interconnect system 200 includes a first optical interconnect device 204 that is demonstrated in the example of FIG. 4 as including three optical fiber ports 206. A first of the optical fiber ports 206 couples the optical interconnect device 204 with an optical fiber cable 208 that can include a plurality of optical fibers 210 therein, and the other two ports can be coupled to additional optical interconnect devices 212 via optical fiber cables 214. As an example, the optical fibers 210 in the optical fiber cable 208 can be split between the optical fiber cables 214. The optical interconnect devices 212 are each demonstrated as including three optical fiber ports 216, with a first one of the optical fiber ports 216 being coupled to the respective optical fiber cables 214. The optical fibers 210 can be further split in each of the optical interconnect devices 212 between the other optical fiber ports 216. A second of the optical fiber ports 216 in each of the optical interconnect devices 212 is coupled to a respective set of the optical devices 202 via a portion of the optical fibers 210. A larger portion of the optical fibers 210 can be provided in another optical fiber cable 218 from the third of the optical fiber ports 216 in each of the optical interconnect devices 212.

The optical fiber cables 218 can couple the respective optical interconnect devices 212 to optical interconnect devices 220. The optical interconnect devices 220 are each demonstrated as including three optical fiber ports 222, with a first one of the optical fiber ports 222 being coupled to the respective optical fiber cables 218. The optical fibers 210 can be further split in each of the optical interconnect devices 220 between the other optical fiber ports 222 to provide optical connectivity to the remaining optical devices 202. As a result of the cascaded-tree arrangement of the optical interconnect system 200, the number of optical fibers 210 can be split at each of the optical interconnect devices 204, 212, and 220, with portions of the optical fibers 210 being provided in each "branch" that extends from the respective optical interconnect devices 204, 212, and 220. Additionally, the optical fibers 210 that are secured in the optical interconnect devices 204, 212, and 220 (e.g., via a molding material) can extend between each of the optical fiber ports 206, 216, and 222 in each of the optical interconnect devices 204, 212, and 220, such as similar to the optical interconnect device 100 in the example of FIG. 3, to provide optical interconnectivity between the optical devices 202.

Similar to as described previously with respect to the example of FIG. 4, by coupling the optical devices 202 to the optical interconnect devices 204, 212, and 220, the network can be arranged in a more efficient and organized manner than by providing optical fiber connectivity of the optical devices 202 directly to the network (e.g., the Internet), such as via an optical router, switch, or other network device, and/or by providing optical fiber connectivity to each other. For example, the lengths and amount of optical fibers 210 can be better controlled and more efficiently organized by implementing optical connectivity of the optical devices 202 to the optical interconnect devices 204, 212, and 220. In addition, in the example of FIG. 5, the optical fiber ports 206, 216, and 222 can be configured as mechanical connectors (e.g., to receive ends of the optical fibers 210), or can be through-connections for contiguous optical fibers 210, such as between the optical devices 202 and the optical fiber cable 208, or any portion therebetween.

Figure 6:
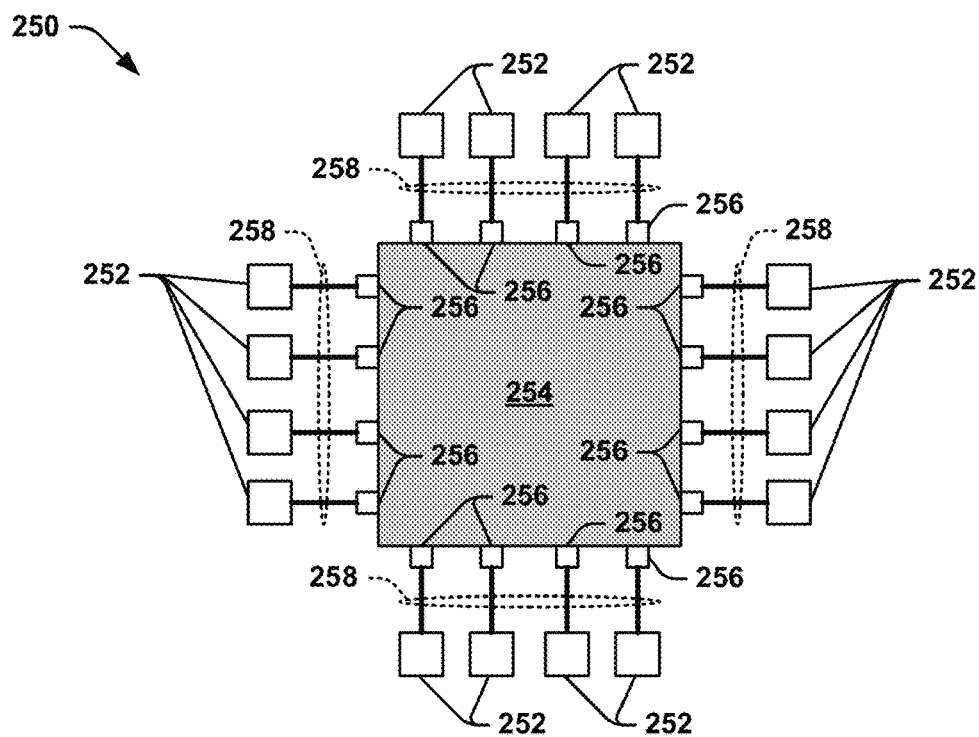
FIG. 6 illustrates yet another example of an optical interconnect system.

FIG. 6 illustrates yet another example of an optical interconnect system. The optical interconnect system 250 can correspond to a network that implements optical communications between a plurality of optical devices 252. As an example, the optical devices 252 can correspond to electro-optic chips, computers, enterprise servers, and/or a combination thereof.

The optical interconnect system 250 includes an optical interconnect device 254 that is demonstrated in the example of FIG. 6 as including sixteen optical fiber ports 256. Each of the optical fiber ports 256 is coupled to a respective one of the optical devices 252 via a respective optical fiber 258. Thus, the optical interconnect system 250 can be configured as a network to provide optical connectivity between each of the optical devices 252. As an example, the optical interconnect device 254 can be configured substantially similar to the optical interconnect device 100 in the example of FIG. 3, such that the optical fibers 258 that are secured within the optical interconnect device 254 (e.g., via a molding material) can extend between each of the other optical fiber ports 256 to provide optical interconnectivity between the optical devices 252. Therefore, the optical interconnect device 254 can be configured to provide an "all-to-all" optical fiber routing arrangement that can be much more efficiently arranged relative to an all-to-all fiber mesh in typical fiber routing arrangements. As an example, one of the optical devices 252 can be replaced by an optical fiber cable that can couple the optical devices 252 to a network, such that optical fibers in the optical fiber cable can extend through the optical interconnect device 254 to each of the optical devices 252 via the optical fiber ports 256 in addition to the optical interconnection between the optical devices 252. Accordingly, the optical interconnect system 250 can be arranged in a variety of ways.

Figure 7:
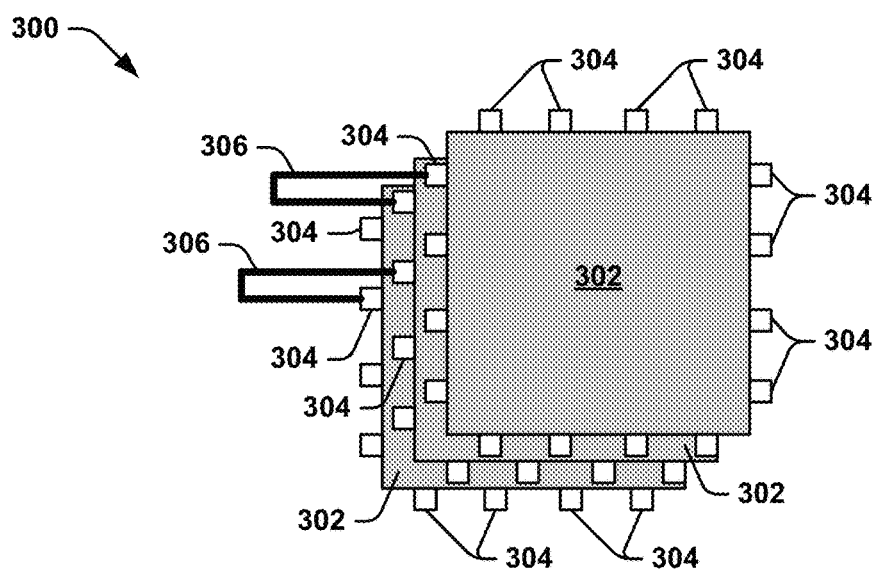
FIG. 7 illustrates a further example of an optical interconnect device assembly.

FIG. 7 illustrates a further example of an optical interconnect device assembly 300. The optical interconnect device assembly 300 is demonstrated in the example of FIG. 7 as being configured as a plurality of individual optical interconnect devices 302 in a stacked arrangement (e.g., in a plan view for ease of demonstration). Each of the individual optical interconnect devices 302 can be configured substantially similar to the optical interconnect device 254 in the example of FIG. 6, and can thus provide "all-to-all" connectivity between each of the optical fiber ports 304 thereon. In the example of FIG. 7, adjacent pairs of the optical interconnect devices 302 are optically coupled via an optical fiber 306 coupled to a given one of the optical fiber ports 304 on each respective one of the optical interconnect devices 302. Therefore, the "all-to-all" optical connectivity of each of the optical interconnect devices 302 is expanded to all of the optical fiber ports 304 on all of the optical interconnect devices 302.

For example, the optical interconnect device assembly 300 can be implemented in a more complex optical routing application to provide optical routing to a large number of optical devices (not shown). Therefore, the optical interconnect device assembly 300 can provide a solution for complex optical routing applications that implements the simplistic design of the individual optical interconnect devices 302 in an aggregate manner. While the optical interconnect device assembly 300 is demonstrated as including three optical interconnect devices 302, a given optical interconnect device assembly can include more or less optical interconnect devices 302 to provide flexibility in complex optical routing schemes.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical interconnect device comprising:
   a plurality of optical fiber ports coupled to a body portion, the plurality of optical fiber ports comprising a mechanical optical connector into which external optical fibers or optical fiber cables can be plugged, or sealed pass-through connections of optical fibers in the optical interconnect device, the body portion comprising:
      a substrate comprising a first surface, wherein the plurality of optical fibers are disposed on the first surface of the substrate to extend between the plurality of optical fiber ports; and
      a molding material that is molded over the plurality of optical fibers on the first surface of the substrate to secure the plurality of optical fibers in the body portion between the plurality of optical fiber ports; and
   a plurality of optical fibers that are secured within the body portion, wherein a first portion of the plurality of optical fibers extends from a first of the plurality of optical fiber ports to a second of the plurality of optical fiber ports and a second portion of the plurality of optical fibers extend from the first of the plurality of optical fiber ports to a third of the plurality of optical fiber ports, wherein the plurality of optical fiber ports are molded to the body portion by the molding material such that the optical fiber ports are secured in fixed locations onto the body portion by the molding material.

2. The device of claim 1, wherein the plurality of optical fiber ports are arranged as strain reliefs that are molded in fixed locations by the molding material.

3. The device of claim 1, wherein the substrate comprises one of a plurality of V-grooves and a plurality of holes based on which the plurality of optical fibers are disposed prior to disposition of the molding material over the plurality of optical fibers.

4. The device of claim 1, wherein the plurality of optical fibers comprises a respective one of the plurality of optical fibers extending between each pair of the plurality of optical fiber ports to provide optical connectivity between each optical fiber port of the plurality of optical fiber ports and each other optical fiber port of the plurality of optical fiber ports.

5. An optical interconnect device assembly comprising a plurality of the optical interconnect devices of claim 4, wherein one of the plurality of optical fiber ports of a first one of the plurality of optical interconnect devices is optically coupled to one of the plurality of optical fiber ports of a second one of the plurality of optical interconnect devices to provide optical connectivity between each optical fiber port of the plurality of optical fiber ports of each of the plurality of optical interconnect devices and each other optical fiber port of the plurality of optical fiber ports of each of the plurality of optical interconnect devices.

6. An optical interconnect system comprising a plurality of the optical interconnect devices of claim 1, the plurality of optical interconnect devices being to optically couple a plurality of optical devices together via optical fibers associated with the plurality of optical interconnect devices.

7. The system of claim 6, wherein each of the plurality of optical interconnect devices are coupled to at least one other of the plurality of optical interconnect devices via a plurality of optical fibers that are arranged in an optical fiber cable.

8. The system of claim 6, wherein the plurality of optical interconnect devices are arranged in a cascaded-tree arrangement, such that the first portion of the plurality of optical fibers extend from the first of the plurality of optical fiber ports to the second of the plurality of optical fiber ports of a first one of the plurality of optical interconnect devices, and wherein the first portion of the plurality of optical fibers extend from the first of the plurality of optical fiber ports to the second of the plurality of optical fiber ports of a second one of the plurality of optical interconnect devices, wherein the second of the plurality of optical fiber ports of the first of the plurality of optical interconnect devices is coupled to the first of the plurality of optical fiber ports of the second of the plurality of optical interconnect devices.

9. An optical interconnect system comprising:
a plurality of optical interconnect devices that are arranged in a cascaded-tree arrangement to optically couple a plurality of optical devices in a network, each of the plurality of optical interconnect devices comprising a plurality of optical fibers that are secured within a body portion and which extend between a plurality of optical fiber ports coupled to the body portion, wherein the plurality of optical fiber ports comprise a mechanical optical connector into which external optical fibers or optical fiber cables can be plugged, or sealed pass-through connections of optical fibers in the optical interconnect device; and
a plurality of fiber cable assemblies that each interconnect a respective pair of the plurality of optical interconnect devices via the respective plurality of optical fiber ports, each of the plurality of fiber cable assemblies comprising the plurality of the optical fibers associated with a respective one of the plurality of optical fiber ports,
wherein each of the plurality of optical interconnect devices comprises:
a substrate comprising a first surface, wherein the plurality of optical fibers are disposed on the first surface of the substrate to extend between the plurality of optical fiber ports; and
a molding material that is molded over the plurality of optical fibers on the first surface of the substrate to secure the plurality of optical fibers in the body portion between the plurality of optical fiber ports, wherein the plurality of optical fiber ports are molded to the body portion by the molding material such that the optical fiber ports are secured in fixed locations onto the body portion by the molding material.

10. The system of claim 9, wherein the plurality of optical fibers associated with each of the plurality of optical interconnect device systems comprises a respective one of the plurality of optical fibers extending between each pair of the plurality of optical fiber ports to provide optical connectivity between each optical fiber port of the plurality of optical fiber ports and each other optical fiber port of the plurality of optical fiber ports.

11. The system of claim 9, wherein the plurality of optical fiber ports are arranged as strain reliefs that are molded in fixed locations by the molding material.

12. The system of claim 9, wherein the substrate comprises one of a plurality of V-grooves and a plurality of holes based on which the plurality of optical fibers are disposed prior to disposition of the molding material over the plurality of optical fibers.

13. An optical interconnect device comprising:
a plurality of strain reliefs;
a plurality of optical fibers, a first portion of the plurality of optical fibers extending from a first of the plurality of strain reliefs to a second of the plurality of strain reliefs and a second portion of the plurality of optical fibers extending from the first of the plurality of strain reliefs to a third of the plurality of strain reliefs;
a substrate comprising a first surface, wherein the plurality of optical fibers are disposed on the first surface of the substrate to extend between the plurality of strain reliefs; and
a molding material that is molded over the plurality of optical fibers on the first surface of the substrate to secure the plurality of optical fibers between the plurality of strain reliefs, wherein the plurality of strain reliefs are molded in a fixed location by the molding material, wherein the plurality of strain reliefs are optical fiber ports.

14. The optical interconnect device of claim 1, further comprising: the mechanical optical connector into which external optical fibers or optical fiber cables can be plugged.

15. The optical interconnect device of claim 1, further comprising: the sealed pass-through connections of optical fibers in the optical interconnect device.

16. The optical interconnect system of claim 9, further comprising: the mechanical optical connector into which external optical fibers or optical fiber cables can be plugged.

17. The optical interconnect system of claim 9, further comprising: the sealed pass-through connections of optical fibers in the optical interconnect device.

18. The optical interconnect device of claim 13, wherein the optical fiber ports comprise a mechanical optical connector into which external optical fibers or optical fiber cables can be plugged, or sealed pass-through connections of optical fibers in the optical interconnect device.

19. The optical interconnect device of claim 18, further comprising: the mechanical optical connector into which external optical fibers or optical fiber cables can be plugged.

20. The optical interconnect device of claim 18, further comprising: the sealed pass-through connections of optical fibers in the optical interconnect device.

* * * * *